(12) United States Patent
Minakata et al.

(10) Patent No.: US 6,658,496 B1
(45) Date of Patent: Dec. 2, 2003

(54) RECORDING/REPRODUCING APPARATUS

(75) Inventors: Yoshimichi Minakata, Kanagawa (JP); Noriyuki Koga, Chiba (JP); Shinjiro Akiha, Saitama (JP); Kenichi Iida, Saitama (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/445,961

(22) PCT Filed: Apr. 16, 1999

(86) PCT No.: PCT/JP99/02038
§ 371 (c)(1),
(2), (4) Date: Dec. 15, 1999

(87) PCT Pub. No.: WO99/54870
PCT Pub. Date: Oct. 28, 1999

(30) Foreign Application Priority Data

Apr. 17, 1998 (JP) .......................................... P10-107942

(51) Int. Cl.[7] ................................................ G06F 3/00
(52) U.S. Cl. ............................... 710/5; 710/13; 704/201
(58) Field of Search .................................. 710/8–15, 17; 709/213, 214; 711/148, 151, 158; 704/201

(56) References Cited

U.S. PATENT DOCUMENTS

| | | | | |
|---|---|---|---|---|
| 5,491,774 A | * | 2/1996 | Norris et al. ................. 704/270 |
| 5,839,108 A | * | 11/1998 | Daberko et al. ............. 704/270 |
| 5,848,422 A | * | 12/1998 | Sato et al. ................... 707/203 |
| 5,903,871 A | * | 5/1999 | Terui et al. .................. 704/500 |
| 5,974,015 A | * | 10/1999 | Iizuka et al. ................. 386/96 |
| 6,032,112 A | * | 2/2000 | Onishi et al. ................ 704/201 |
| 6,076,063 A | * | 6/2000 | Unno et al. .................. 704/500 |
| 6,239,837 B1 | * | 5/2001 | Yamada et al. ............ 348/231.5 |
| 6,453,281 B1 | * | 9/2002 | Walters et al. .............. 704/200 |

* cited by examiner

*Primary Examiner*—Jeffrey Gaffin
*Assistant Examiner*—Eron Sorrell
(74) *Attorney, Agent, or Firm*—Jay H. Maioli

(57) ABSTRACT

A control method for controlling a recording/reproducing apparatus having plural storage units and equipment to which the recording/reproducing apparatus. The recording/ reproducing apparatus is connected has first and second storage units in which data and management data are stored. The equipment, to which is connected the recording/ reproducing apparatus, has a third storage unit in which are stored the data and the management data. It is detected whether the equipment to be connected to the recording/ reproducing apparatus has been connected to the recording/ reproducing apparatus. If such connection is detected, the management data are read from the first and second storage units. Based on the read management data and the management data stored in the third storage unit of the equipment, connected to the recording/reproducing apparatus, new management data, supervising the first to third storage units as one storage unit, are generated. The writing and reading for the plural storage units are controlled based on the generated new management data.

18 Claims, 8 Drawing Sheets

| FILE NUMBER | TASK NUMBER | START ADDRESS | END ADDRESS | LP/SP | PRIORITY | ALARM/ NON-ALARM | RECORDING DATE AND TIME | ALARM TIME |
|---|---|---|---|---|---|---|---|---|
| 01 | 01 | ×××× | ○○○○ | SP | 3 | 1 | ××× | ○○○ |
| 01 | 02 | □□□□ | △△△△ | LP | 1 | 0 | △△△ | --- |
| | | | | | | | | |

FIG.2

| FILE NUMBER | TASK NUMBER | START ADDRESS | END ADDRESS | LP/SP | PRIORITY | ALARM/ NON-ALARM | RECORDING DATE AND TIME | ALARM TIME |
|---|---|---|---|---|---|---|---|---|
| 01 | 01 | △△△△ | ○○○○ | LP | 0 | 0 | ××× | --- |
| 01 | 02 | ×××× | □□□□ | SP | 1 | 1 | △△△ | ○○○ |
| | | | | | | | | |

FIG.3

| MEMORY NUMBER | FILE NUMBER | TASK NUMBER | START ADDRESS | END ADDRESS | LP/SP | PRIORITY | ALARM/ NON-ALARM | RECORDING DATE AND TIME | ALARM TIME |
|---|---|---|---|---|---|---|---|---|---|
| 00 | 01 | 01 | ×××× | ○○○○ | SP | 3 | 1 | ××× | ○○○ |
| 01 | 01 | 02 | ×××× | □□□□ | SP | 1 | 1 | △△△ | ○○○ |
| 00 | 01 | 02 | □□□□ | △△△△ | LP | 1 | 0 | △△△ | --- |
| 01 | 01 | 01 | △△△△ | ○○○○ | LP | 0 | 0 | ××× | --- |
| | | | | | | | | | |

RECORDING/REPRODUCING APPARATUS

TECHNICAL FIELD

This invention relates to a recording/reproducing apparatus and a method for controlling equipment to which is connected the recording/reproducing apparatus. More particularly, it relates to a recording/reproducing apparatus having plural memory units and a method for controlling equipment to which is connected the recording/reproducing apparatus.

BACKGROUND ART

There has hitherto been provided a recording/reproducing apparatus having a flash memory for storage of speech signals on the file basis. This recording/reproducing apparatus is designed not only to store the speech input to a microphone as speech data in the flash memory but also to store data used for e.g., computer data processing. That is, the recording/reproducing apparatus not only has the speech information recording/reproducing function but also is able to record and store desired data as a recording medium.

Meanwhile, a user wanting to transfer data stored in a flash memory of a recording/reproducing apparatus has to transfer data read from the flash memory to external equipment, such as a data computer, using communication means, for processing, or to transfer the read-out data via an external output unit designed to output the speech. However, this data transfer to the external equipment is a cumbersome operation.

For facilitating data transfer, it may be contemplated to provide a main body unit of the recording/reproducing apparatus with a detachable flash memory and to connect the flash memory detached from the main body unit to a computer.

The recording/reproducing apparatus, from which has been detached the flash memory, and which thus has no flash memory as data storage means, no longer has the function as a data recording/reproducing apparatus. It is not necessarily reasonable to store required data in a removable flash memory provided on the main body unit of the apparatus.

DISCLOSURE OF THE INVENTION

In view of the above-described status of the art, it is an object of the present invention to provide a recording/reproducing apparatus in which it is possible to improve tractability of a recording/reproducing apparatus having plural storage units, such as removable storage units, and to facilitate the operation of transfer processing for data stored in a storage unit of the recording/reproducing apparatus. It is another object of the present invention to provide a method for controlling the equipment to which is connected the recording/reproducing apparatus.

For accomplishing the above object, the recording/reproducing apparatus according to the present invention includes plural storage units for storing data and management data for supervising the data, and control means for reading out the respective management data from the respective storage means to generate new management data and handling the respective storage units as one based on the new management data to control data writing and data readout.

The recording/reproducing apparatus writes or reads out data for the respective storage units, based on the management data of the respective storage units, to enable the data to be handled easily by a user not conscious of the distinction between the respective storage units.

Other objects and particular advantages of the present invention will become more apparent from the explanation of following embodiments of the invention.

BRIEF DESCRIPTION OF THE DRAWINGS

FIG. 2 is a diagram showing an enclosed type flash memory provided in the IC recorder.

FIG. 3 is a diagram showing a detachable flash memory provided in the IC recorder.

BEST MODE FOR EXECUTING THE INVENTION

Figure 1:
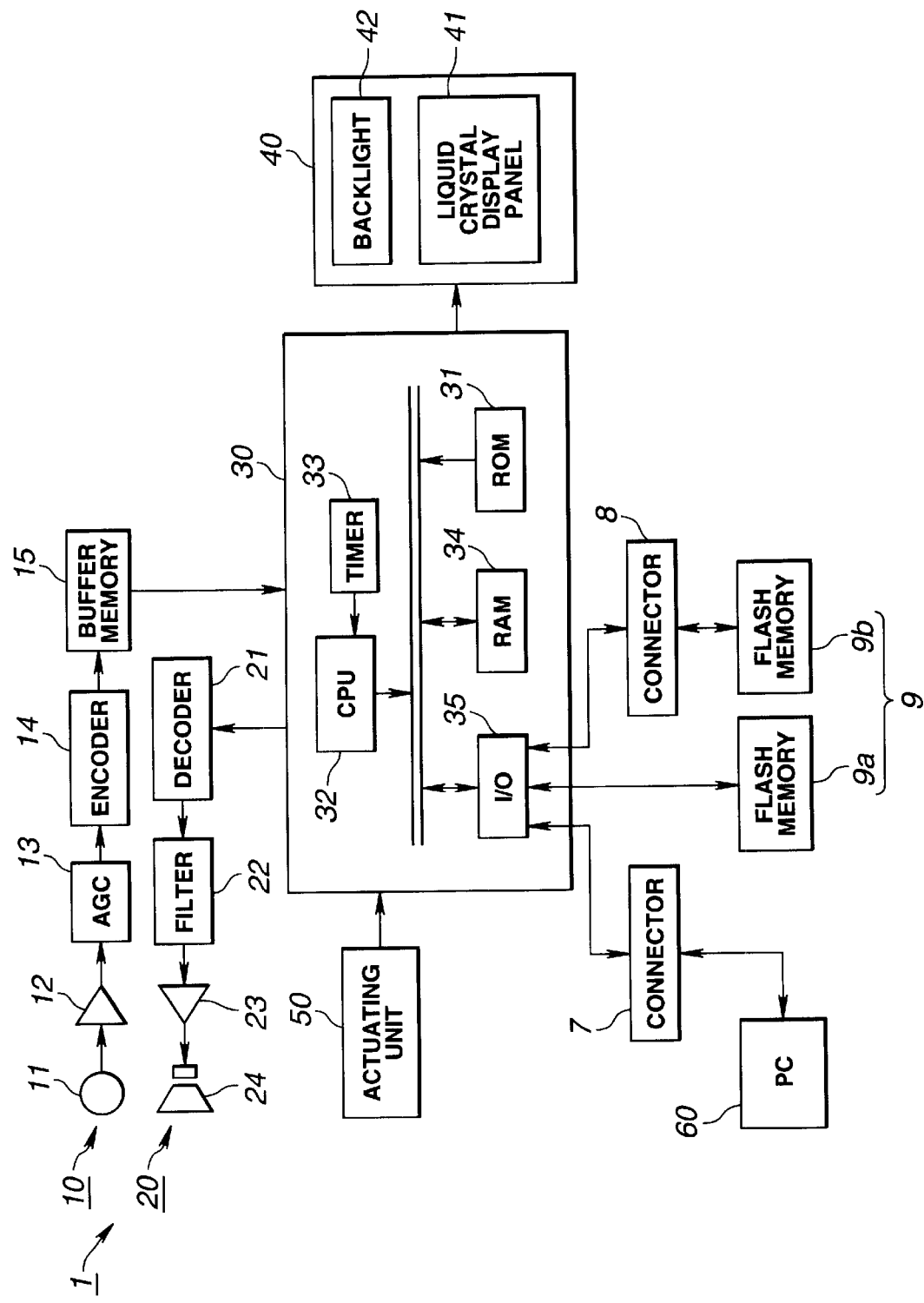
FIG. 1 is a block diagram showing an IC recorder embodying the present invention.

A recording/reproducing apparatus according to the present invention is now explained in detail with reference to the drawings.

First, explanation will be made of a first embodiment of the recording/reproducing apparatus of the present invention.

The recording/reproducing apparatus according to the present invention (termed simply an IC recorder) includes a flash memory 9, which is an electrically erasable/programmable read-only memory (EEPROM) allowing for electrical data erasure/rewriting by a recording unit 10, a controller 30 for performing control to write speech data in the flash memory 9 and to reproduce speech data read out from the flash memory 9 by a reproducing unit 20, and a display unit 40 for displaying the actuation contents from an actuating unit 50 and the speech data contents stored in the flash memory 9.

The flash memory 9, used herein, includes a first flash memory 9a nondetachably enclosed in the IC recorder 1 and a second flash memory 9b detachable from the IC recorder 1.

The recording unit 10 includes a microphone for converting the speech into electrical signals outputting the converted speech signals, and an amplifier 12 for amplifying output speech signals of the microphone 11. The recording unit 10 also includes an automatic gain control circuit 13, referred to below as automatic gain controller or AGC, and an encoder 14 for converting output speech signals of the AGC 13 into speech data. The recording unit 10 likewise includes a buffer memory 15 for transiently storing speech data from the encoder 14.

The microphone 11 collects the sound and transduces the collected sound into speech signals, which then are routed to the amplifier 12. The amplifier 12 amplifies the speech signals from the microphone 11 to route the amplified speech signals to the AGC 13. The AGC 13 controls the gain so that the gain of the speech signals amplified by the amplifier 12 will be at a pre-set value, and routes the gain-controlled speech signals to the encoder 14.

The encoder 14 exploits the strong temporal correlation of the speech signals and encodes the speech signals by, for example, adaptive differential pulse code modulation (ADPCM) to generate speech data which then is routed via buffer memory 15 and controller 30 to the flash memory 9. The encoder 14 is able to adjust the encoding volume of the speech data responsive to two modes, such that it effectuates sampling at 8 kHz and 4 kHz if the mode is the standard play (SP) mode or the long play (LP) mode, respectively, to adjust the encoding volume of the speech signals with respect to the time axis direction. The SP or LP mode can be optionally selected by the user acting on the actuating unit 50.

The recording unit 10 is in operation beginning when a recording start button, not shown, of the actuating unit 50, is pressed, until a stop button, not shown, is pressed. During this time, speech data corresponding to the output speech signals of the microphone 11 is recorded as a task file in the flash memory 9. If, for example, the second flash memory 9b is not loaded on the IC recorder 1, the speech data is stored in the first flash memory 9a. If the second flash memory 9b is loaded on the IC recorder 1 and the first flash memory 9a is charged to its full capacity, the speech data is written in the second flash memory 9b.

The first flash memory 9a is enclosed in the IC recorder 1, while the second flash memory 9b can be attached to the IC recorder 1 and is connected to the controller 30 via connector 8. It can be optionally determined whether speech data is to be written with priority in the first flash memory 9a or in the second flash memory 9b. Alternatively, a changeover button may be provided in the actuating unit 50 to permit the user to select in which of the first or second flash memories 9a or 9b the speech data is to be stored.

The first flash memory 9a has, along with a task file storage area in which to store speech data, that is task files, a TOC data storage area in which to store the TOC (table-of-contents) data used to supervise the respective task files. Referring to FIG. 2, the TOC data stored in the TOC data storage area is constituted by "file number", "task number", "start address", "end address", "LP/SP", "priority", "alarm/non-alarm", "priority", "recording date and time", and "alarm time", on the file basis.

The "file number" is a number used to roughly group the respective task files, and is analogous to a directory or a folder. The "file number" is, for example, "00", "01", and "10", associated with files A, B, and C, respectively. The user is able to record a task file on a work in the file A or to record a task file on personal taste in the file B, for example, by way of supervising the task files.

The "task number" indicates the number of the recorded task file and specifically the order of the task files recorded in one of the files A to C. By these "task numbers", the task file is identified as being, for example, "task file of a task number of the file C" or "task file of a task number 1 of the file C", depending on the "file number" and the "task number".

The "start address" specifies a physical start address of the recorded task file, while the "end address" specifies the physical end address of the task file.

The "LP/SP" means the recording mode of the aforementioned task file. The LP mode and the SP mode differ from each other as to the sampling frequency for recording, as mentioned previously.

The "priority" specifies the degree of priority of the task file. The larger the number, the higher the degree of priority. The number for "priority" is from 0 to 3, with the priority 3 denoting the highest priority.

The "alarm/non-alarm" specifies that an alarm reproducing function is set on the task file. The alarm reproducing function means the function of reproducing the recorded task file at a pre-set time point.

The "recording date and time" means the actual task file recording time and date.

The "alarm time" means the time point of reproducing the task file for which the alarm has been set.

For example, in the first flash memory 9a in FIG. 2, the task file of the file number A with the task number 01 has been recorded with the SP mode, with the priority being 3. The task file with the file number A with the task number 02 has been recorded with the LP mode, with the priority being 1.

The second flash memory 9b is configured similarly to the first flash memory 9a, and has, in addition to the task file storage area for storing a task file, a TOC data storage area for storing TOC data designed to supervise the task files. The TOC data, stored in the TOC data storage area, is configured similarly to the TOC data of the first flash memory 9a, as shown in FIG. 3. For example, the task file of the file number A and the task number 01 in the second flash memory 9b in FIG. 3 is recorded in the LP mode and has the priority equal to 0, while the task file of the file number A and the task number 02 is recorded in the SP mode and has the priority equal to 1.

The reproducing unit 20 has a decoder 21 for transducing speech data read out from the flash memory 9 controlled by the controller 30, a filter 22 for removing high-range components, and an amplifier 23 for amplifying speech signals from the filter 22 to send the amplified signal to a speaker 24.

The decoder 21 is a counterpart device of the encoder 14 of the recording unit 10, and decodes speech data, which is speech data encoded by the ADPCM system read out from the flash memory 9 responsive to the sampling points mp 11, mp 12, . . . , mp 1k or LP mode, to generate so-called PAM signals. The filter 22 eliminates high-frequency components higher than the audible range from the PAM signals to output speech signals. The amplifier 23 amplifies the speech signals supplied from the decoder 21 to route the amplified signals to the speaker 24. The speaker 24 is fed with and driven by the speech signals to reproduce speech data recorded in the flash memory 9.

The controller 30 includes a ROM 31, having stored therein a program for controlling the operation of the IC recorder 1, and a micro-computer, referred to below as a CPU 32, executing the program stored in the ROM 31, for controlling the flash memory 9, recording unit 10, reproducing unit 20 and the display unit 40. The controller 30 also includes a timer 33 for generating the timing information, a random access memory, referred to below as RAM 34, for temporarily storing the time and the results of program execution etc, and an input/output (I/O) port 35 for connection to outside, and controls for the various circuits based on operational setting by the actuating unit 50.

The RAM 34 stores, on startup, the TOC (table-of-contents) information, read out from the flash memory 9, or timing data for reproducing the speech file. The CPU 32 compares the reproducing time stored in the RAM 34 to the timing information of the timer 33 and reproduces the speech file on coincidence between the two data.

The display unit 40 includes a liquid crystal display element 41 of low power consumption and a backlight 42 for illuminating the liquid crystal display element 41 and displays the operating state or the actuating sequence of the IC recorder 1 on the liquid crystal display element 41.

With the above-described IC recorder 1, data can be co-owned without distinction between the first flash memory 9a and the second flash memory 9b. Since the TOC data are recorded in the first and second flash memories 9a, 9b, these TOC data need to be supervised collectively. Thus, if the power source is turned on to start the IC recorder 1, or before start of the recording/reproducing operation, the CPU 32 performs the processing shown in step ST1 and in the following steps shown in FIG. 4.

At step ST1, the CPU 32 reads out TOC data in the first flash memory 9a to store the read-out data in the RAM 34. The CPU 32 then proceeds to step ST2.

At step ST2, the CPU 32 verifies whether or not connection is made to the second flash memory 9b via connector 8, that is whether or not there is the second flash memory 9b. If the result of step ST2 is YES, that is if connection is made to the second flash memory 9b, the CPU 32 proceeds to step ST3 and, if not, the CPU 32 proceeds to step ST4. The detection at step ST2 as to whether or not there is the connection to the second flash memory 9b may also be made mechanically by providing the connector 8 with a switch actuated on insertion and connection of the second flash memory 9b, or by the CPU 32 determining whether or not data exchange is possible with the second flash memory 9b via connector 8. It is also possible to use other methods to detect by the CPU 32 whether or not there is a connection to the second flash memory 9b.

At step ST3, the CPU 32 reads out TOC data of the second flash memory 9b to store the read-out data in the RAM 34. The CPU 32 then proceeds to step ST4.

At step ST4, the CPU 32 appends to the read-out TOC data of the first and second flash memories 9a, 9b memory numbers indicating to which of the two flash memories the TOC data belong, and generates new TOC data on the RAM 34. Meanwhile, if the second flash memory 9b is not connected, the TOC data of the first flash memory 9a is directly stored in the RAM 34.

Figures 4, 5:
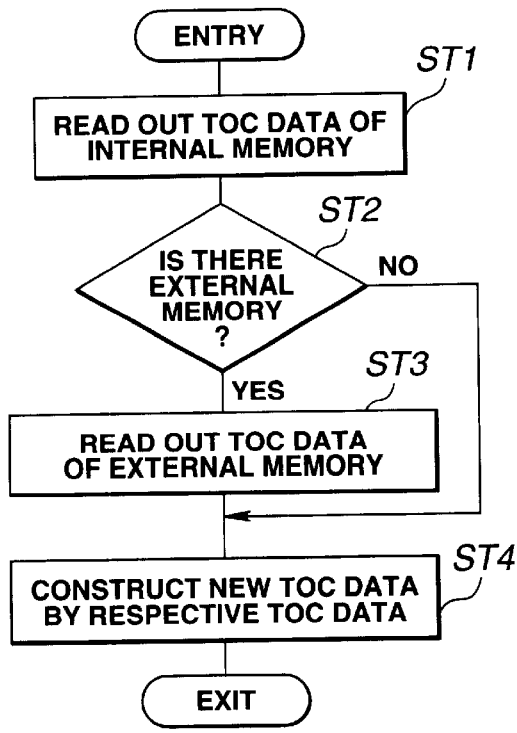
FIG. 4 is a flowchart for illustrating the CPU operation at the time of starting of an IC recorder.
FIG. 5 is a diagram showing TOC (Table of Contents) data for monistically managing task files recorded on the enclosed or detachable flash memory.

After the end of the processing of the steps ST1 to ST4, the TOC data configured as shown in FIG. 5 is constituted on the RAM 34. Meanwhile, the TOC data is constructed by the respective TOC data of the first and second flash memories 9a, 9b.

The TOC data, shown in FIG. 5, is configured substantially similarly to the respective TOC data of the flash memories 9a, 9b, and is made up of "memory number", "file number", "task number", "start address", "end address", "LP/SP", "priority", "alarm/non-alarm", "priority", "recording date and time", and "alarm time", on the task file basis. The memory number of "00" or "01" specifies that the task file is that of the first flash memory 9a or that of the second flash memory 9b, respectively. Thus, the respective task files are specified by the "memory number", "file number" and the "task number". If a pre-set operation is performed by the actuating unit 50, the CPU 32 sorts the task files in the order of dates, alarm or priority, based on the TOC data shown in FIG. 5, to display the contents concerning the task file selected by the user by the actuating unit 50 on the liquid crystal display element 41 of the display unit 41.

The IC recorder 1 newly generates TOC data of the respective task files stored in the first and second flash memories 9a, 9b, by the CPU 32, from the respective TOC data of the first and second flash memories 9a, 9b, and displays the contents of the respective task files on the display unit 40, based on the generated TOC data. Thus, the contents of the respective task files can be outputted from the speaker 24 to the user or presented on the display unit 40 without the user becoming conscious in which of the first and second flash memories 9a, 9b the task file desired by the user is stored.

The operation of the CPU 32 when moving the task file is explained. It is assumed that the respective TOC data of the first and second flash memories 9a, 9b have been read out from the flash memories 9a, 9b and already stored in the RAM 34.

Figure 6:
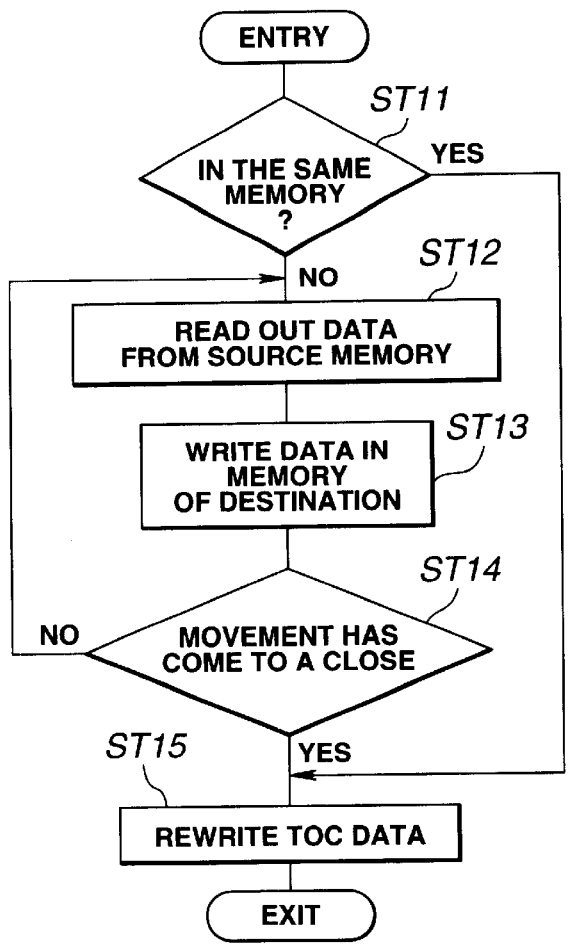
FIG. 6 is a flowchart for illustrating the operation of the CPU when moving the task files.

If the user acts on the actuating unit 50 to command movement of a specified task file, the CPU 32 performs the processing as from step ST11 shown in FIG.6.

At step ST11, the CPU 32 checks whether or not the task file to be moved is that in the same flash memory. Specifically, the CPU 32 checks whether the task file of the first flash memory 9a or the second flash memory 9b is to be moved in the first flash memory 9a or in the second flash memory 9b. If it is found that the task file is to be moved in the same flash memory, the CPU 32 proceeds to step ST15 and, if not, the CPU 32 proceeds to step ST12. The task file movement in the same flash memory may be exemplified by storage of a task file stored as a file A as a task file of the file C.

At step ST12, the CPU 32 reads out the task file to be moved from a source flash memory, such as first flash memory 9a, to store the read-out task file in the RAM 34. The CPU 32 then moves to step ST13.

At step ST13, the CPU 32 reads out the task file stored in the RAM 34 to start the process of writing the file in the flash memory of destination, such as the second flash memory 9b. The CPU 32 then proceeds to step ST14.

At step ST14, the CPU 32 checks whether movement of a task file to the flash memory of destination, such as the second flash memory 9b, has come to a close, that is whether or not data constituting the task file has been written in its entirety in the flash memory of destination. If the movement of a task file to the flash memory of destination has not come to a close, the CPU 32 reverts to step ST12. This repeats the processing from step ST12 to step ST14 to write the task file being moved in the destination flash memory. If the movement of a task file to the flash memory of destination has come to a close, the CPU 32 deletes the task file moved from the source flash memory to proceed to step ST15.

At step ST15, the CPU 32 rewrites the TOC data in the source flash memory and in the flash memory of destination, stored in the RAM 34, to write new TOC data in the first and second flash memories 9a, 9b to terminate the processing. If it is found at step ST11 that movement of the task file being moved is within the same flash memory, the CPU 32 rewrites only TOC data of the pertinent one of the first and second flash memories 9a, 9b.

Figure 7:
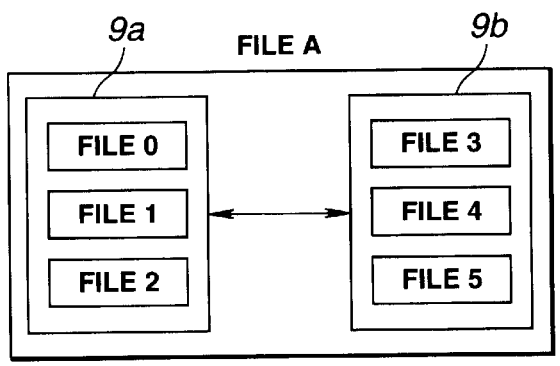
FIG. 7 illustrates the state of the task files recorded in each flash memory.

The IC recorder 1 collectively supervises and handles the files 0 to 5 of the flash memories 9a, 9b, across the first and second flash memories 9a, 9b, as a group of a file A, without making distinction as to whether the task files stored in the first and second flash memories 9a, 9b are stored in the flash memory 9a or in the flash memory 9b, as shown for example in FIG.7.

Therefore, the source of the task file being moved may be the first flash memory 9a or second flash memory 9b. Thus, the user is able to execute the movement of the task files without knowing whether the flash memory to which the task file is to be moved is the first flash memory 9a or the second flash memory 9b, or whether the flash memory to which the task file is to be moved is the detachable second flash memory 9b or the first flash memory 9a in the IC recorder 1.

Although movement of the task file is taken as an example in the preferred embodiment, recording, reproduction, erasure, retrieval or copying of the task file can similarly be made without distinction between the first and second flash memories 9a, 9b. Thus, the user is able to handle task files without the necessity of knowing in which of the flash memories the ask file is stored.

By storing the necessary task files in the second flash memory 9b, dismounting this second flash memory 9b from the IC recorder 1 and connecting it to another device, such as a personal computer, task files can be transferred easily from the IC recorder 1 to the other device.

For example, if such a telephone handset is available by which task files can be stored in the second flash memory 9b or by which task files recorded in the second flash memory 9b or other flash memories, the contents of the telephone call can be stored in the second flash memory 9b, and the second flash memory 9b can be detached from the second flash memory 9b and loaded on the IC recorder 1 to hear the contents of the telephone conversation stored in the second flash memory 9b. Conversely, the second flash memory 9b can be detached from the IC recorder 1 and loaded on the aforementioned telephone handset to reproduce the task files recorded in the second flash memory 9b for hearing by the counterpart of telephone conversations.

Since the image data generating device has the so-called enclosed type first flash memory 9a, that is not detachable from the IC recorder 1, speech data can be recorded using the first flash memory 9a, even if the second flash memory 9b has been detached from the IC recorder 1, while the task file can be reproduced on the basis of the TOC data of the first flash memory 9a.

A second embodiment of the present invention is now explained. In the present second embodiment, it is assumed that the IC recorder 1 and a personal computer 60 as an external equipment are interconnected by a connector 7, as shown in FIG. 1. It is assumed that the personal computer 60 has a storage unit for storage of plural task files and TOC data for supervising the task files.

If the IC recorder 1 is connected to the personal computer 60 via connector 7 and a connection cable, the actuating unit 50 of the IC recorder 1 ceases its operation to evade complexity of the operation. An input signal from the actuating portion of the personal computer 60 is sent to the controller 30 such that the IC recorder 1 is controlled by the personal computer 60. On startup of the application, the personal computer 60 performs the processing as from step ST21 to step ST26 as shown in FIG. 8.

At step ST21, the personal computer 60 exchanges signals or data with the IC recorder 1 via connector 7 to check the connection. If the personal computer 60 verifies that it is connected to the IC recorder 1, it proceeds to step ST22. If the personal computer 60 does not detect that it is connected to the IC recorder 1, such that transmission data is not sent from the IC recorder 1 to the personal computer 60 within a pre-set time, a time-out is judged to have occurred and, the personal computer 60 proceeds to step ST26.

At step ST22, the personal computer 60 performs the processing of reading out the totality of TOC data from the first and second flash memories 9a, 9b of the IC recorder 1. If the totality of the TOC data has been read out from the respective first and second flash memories 9a, 9b, the personal computer 60 proceeds to the second step 23. If, for example, there is no task file stored in the first or second flash memories 9a, 9b, such that the pre-set time has elapsed without TOC data being read out to produce a time-out, the personal computer 60 proceeds to step ST26.

Figures 8, 9:
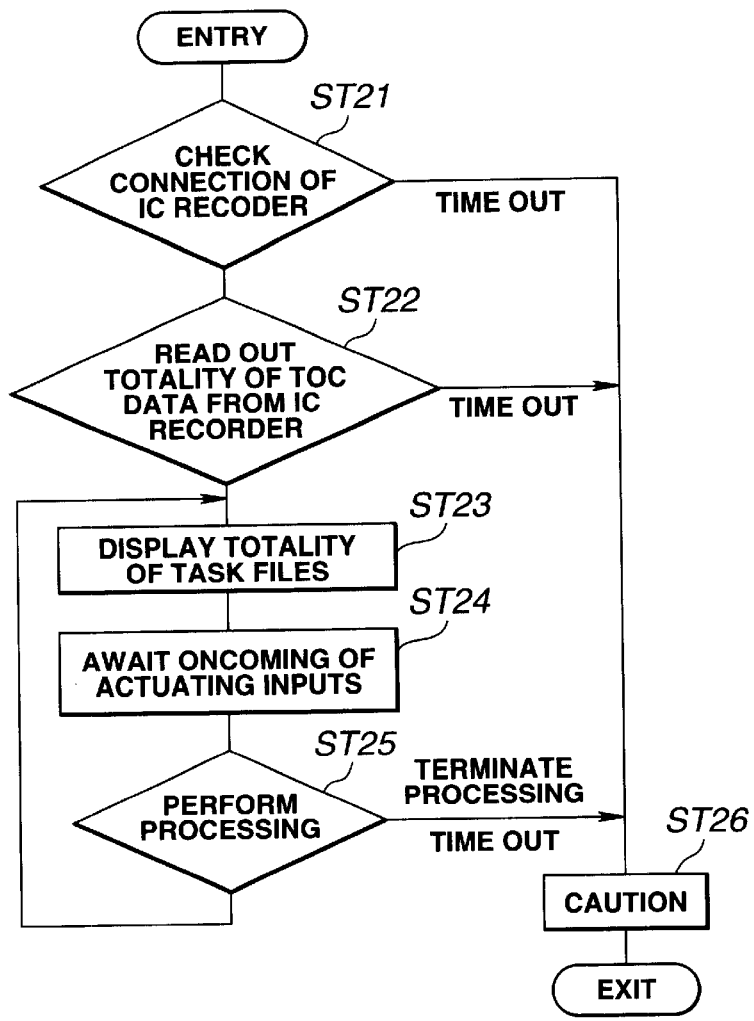
FIG. 8 is a flowchart showing control contents of a personal computer on startup of the application, with the IC recorder being connected to the personal computer.
FIG. 9 is a diagram showing TOC data for monistically managing the task files recorded on the enclosed or detachable flash memory or personal computer.

At step ST23, the personal computer 60 displays the information on the totality of task files, such as TOC data shown in FIG. 9 on a display device, not shown, based on the TOC data read out from the first and second flash memories 9a, 9b. The personal computer 60 then proceeds to step ST24.

At step ST24, the personal computer 60 awaits actuating inputs from actuating portions, such as a keyboard or mouse, not shown, to proceed to step ST25.

At step ST25, the personal computer 60 performs the processing conforming to the actuating input from the actuating unit. The personal computer 60 then reverts to step ST23. If the processing at step ST23 comes to a close or in case of a time-out, the personal computer 60 proceeds to step ST26.

At step ST26, the personal computer 60 indicates on the display unit that the processing up to step ST25 has come to a close, or that a time-out has occurred. The personal computer 60 then terminates the processing.

The personal computer 60 thus reads out and supervises the TOC data of the first and second flash memories 9a, 9b from the IC recorder 1 to control the operation of the IC recorder 1.

The personal computer 60 generates new TOC data, as shown for example in FIG. 9, based on TOC data read out from the first and second flash memories 9a, 9b, and TOC data for the personal computer supervising the task files within the personal computer 60. The new TOC data, thus generated, is stored in a storage area dedicated to the storage unit designed to store the TOC data for the personal computer 60.

The TOC data, shown in FIG. 9, is configured substantially similarly to the TOC data shown in FIG. 9, and is made up of "memory number", "file number", "task number", "start address", "end address", "LP/SP", "priority", "alarm-/non-alarm", "recording date and time", and "alarm time".

The "memory number" of "00", "01" or "10" denotes the task file of the first flash memory 9a, task file of the second flash memory 9b and the task file stored in the personal computer 60, respectively. In the "start address" and "end address" of the task files of the TOC data, stored in the personal computer 60, there are indicated the filenames of the task files, as shown in FIG. 9.

For example, in FIG. 9, the task file of the file number 01, with the task number 01, stored in the first flash memory 9a, is of SP mode and the priority 3. The task file of the file number 01, with the task number 02, stored in the personal computer 60, has the pre-set filename, with the mode being the SP mode and the priority equal to 2.

Using the TOC data, shown in FIG. 9, the personal computer 60 displays the information of the respective task files on a display device, not shown, in the order of falling priority, in the order of the alarm setting time remoteness from the current time or in the order of earlier recording time. Thus, the user is able to handle task files without becoming conscious as to in which of the IC recorder 1 or the personal computer 60 the task file being handled is recorded, so that the user interface can be improved in tractability.

The configuration of communication data when the communication is between the IC recorder 1 and the personal computer 60 is hereinafter explained.

Figure 10:
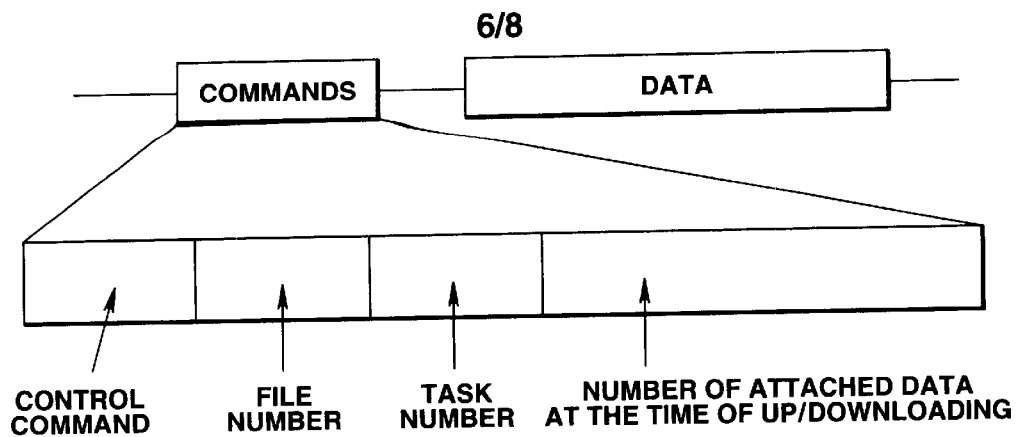
FIG. 10 shows the structure of communication data between the IC recorder and the personal computer.

The communication data is made up of "commands" and "data", as shown in FIG. 10. The "commands" may be enumerated by a "control command", "file number", "task number" and the "number of attached data". The "control command" shows the contents of control commands, such as upload/download. The "number of attached data" indicates the number of attached data at the time of downloading. The communication data is occasionally devoid of a data portion, depending on the contents of the control command.

Figure 11:
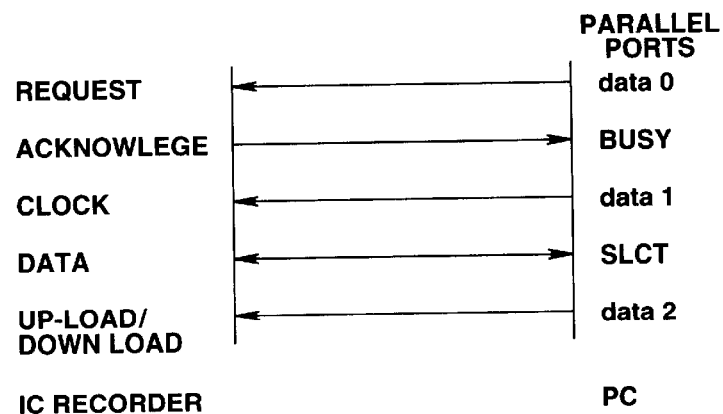
FIG. 11 illustrates parallel ports of the IC recorder and the personal computer.

The exchange of communication data between the IC recorder 1 and the personal computer 60 is explained. It is assumed here that the IC recorder 1 and the personal computer 60 are provided with parallel ports to have parallel communication with each other. As the parallel ports of the personal computer 60 of the IC recorder 1 and the personal computer 60, there are provided parallel ports "data 0", "data 1", "data 2", "busy" and "select", as shown in FIG. 11.

Figure 12:
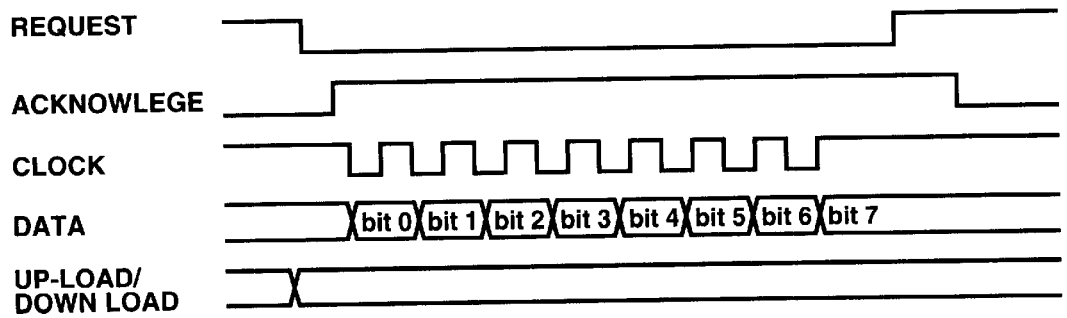
FIG. 12 is a timing chart for data transmission/reception between the IC recorder and the personal computer.

First, the personal computer 60 sends a request signal inquiring the IC recorder 1 whether or not data can be exchanged and, directly after sending the request signal, sends a control command instructing uploading or downloading to the IC recorder 1, as shown in FIG. 12. If ready for transmission/reception, the IC recorder 1 returns an acknowledgement signal to the personal computer 60. On confirming reception of the acknowledgement signal, the personal computer 60 sends pre-set clocks to the IC recorder 1 and transmits/receives data for uploading or downloading in synchronism with the clocks.

Figure 13:
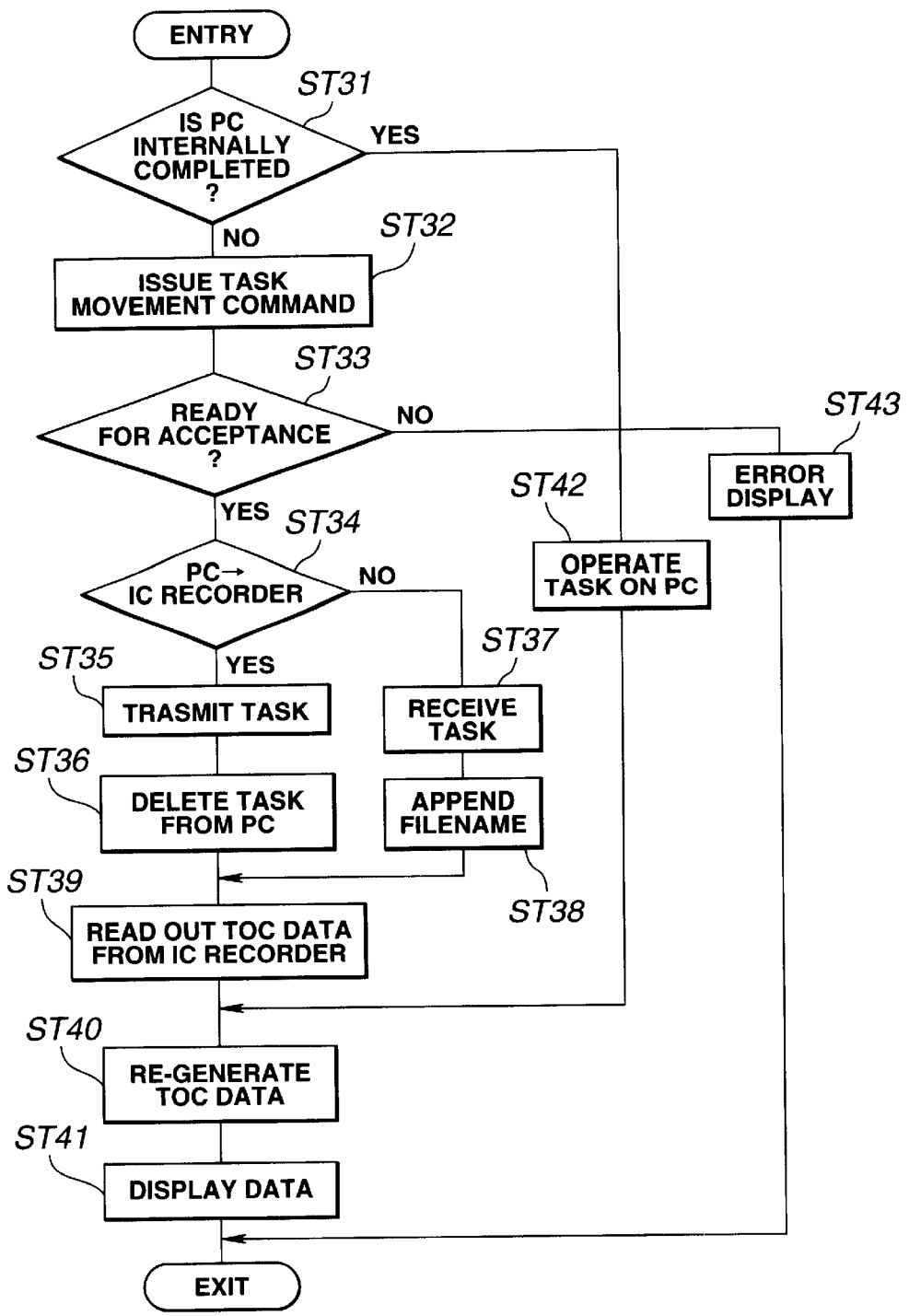
FIG. 13 is a flowchart for illustrating control contents of a personal computer when a task file is to be moved when the IC recorder is connected to the personal computer.

In a state in which the IC recorder 1 and the personal computer 60 can have data transmission/reception with each other, task files can be moved easily between the IC recorder 1 and the personal computer 60. Specifically, the personal computer 60 performs the processing as from step ST31 shown in FIG. 13.

At step ST31, the personal computer 60 checks whether or not the task movement is internally completed, that is whether the task file is moved between it and the IC recorder 1. If the personal computer 60 has verified that the task file has not moved between it and the IC recorder 1, the personal computer 60 proceeds to step ST42 and, if otherwise, it proceeds to step ST32.

At step ST32, the personal computer 60 sends a request signal to the IC recorder 1. Directly after sending the request signal, the personal computer 60 sends a request signal to the IC recorder 1. Directly after transmission of the request signal, a "command" having a "task movement command" is sent as the "control command" shown in FIG. 10 to the IC recorder 1. The personal computer 60 then proceeds to step ST33.

At step ST33, the personal computer 60 verifies whether the IC recorder 1 has received a task issuing command and is ready for acceptance. Specifically, the personal computer 60 verifies whether or not it has received the acknowledge signal from the IC recorder 1 and, if it has received the acknowledge signal, the personal computer 60 deems that the IC recorder 1 is ready for acceptance and proceeds to step ST34. If the acknowledge signal is not received within a pre-set tine, the personal computer 60 deems that the IC recorder 1 is not ready for acceptance, and proceeds to step ST43.

At step ST34, the personal computer 60 verifies whether or not the task being moved has been moved from the personal computer 60 to the IC recorder 1. If the task is moved from the personal computer 60 to the IC recorder 1, the personal computer 60 proceeds to step ST35. If the task has not been moved from the personal computer 60 to the IC recorder 1, the personal computer 60 deems that the task file is moved from the IC recorder 1 to the personal computer 60 and proceeds to step ST37.

At step ST35, the personal computer 60 transmits the task file to be moved to the IC recorder 1 and then proceeds to step ST36. In association with the processing at step ST35, the personal computer 60 performs control to update the TOC data of the flash memory 9.

At step ST36, the personal computer 60 deletes the transmitted task file from the storage unit of the personal computer 60 and proceeds to step ST39. The personal computer 60 also updates the TOC data supervising the task file stored in the storage unit of the personal computer 60.

At step ST37, to which the personal computer 60 moves when it verifies at step ST34 that the task file being moved has not been moved from the personal computer 60 to the IC recorder 1, the personal computer 60 receives the task file from the IC recorder 1 and proceeds to step ST38. In association with the processing at step ST37, the personal computer 60 performs control to update the TOC data of the flash memory 9.

At step ST38, the personal computer 60 appends the filename to the received task file for storage in the storage unit of the personal computer 60. The personal computer 60 then proceeds to step ST39. At this time, the personal computer 60 deletes the received task file from the flash memory 9 of the IC recorder 1 and updates the TOC data of the flash memory 9, as mentioned previously.

At step ST39, the personal computer 60 reads out the TOC data from the flash memory 9 of the IC recorder 1 and then proceeds to step ST40.

At step ST40, the personal computer 60 re-generates the TOC data, which supervises the totality of the task files, based on the read-out TOC data and the TOC data in the personal computer 60. The personal computer 60 then proceeds to step ST41.

At step ST41, the personal computer 60 performs control to display data concerning task files stored in the IC recorder 1 and in the personal computer 60, based on the re-generated TOC data, to terminate the processing.

At step ST42, to which the personal computer 60 moves when it has been verified at step ST31 that the task movement is internally completed, the personal computer 60 moves the task file in accordance with the operational setting on the personal computer 60, before proceeding to step ST40.

At step ST43, to which the personal computer 60 proceeds when it has verified at step ST33 that the IC recorder 1 has not been readied for acceptance within the pre-set time, the personal computer 60 displays the error on the display device, not shown, to terminate the processing.

Figure 14:
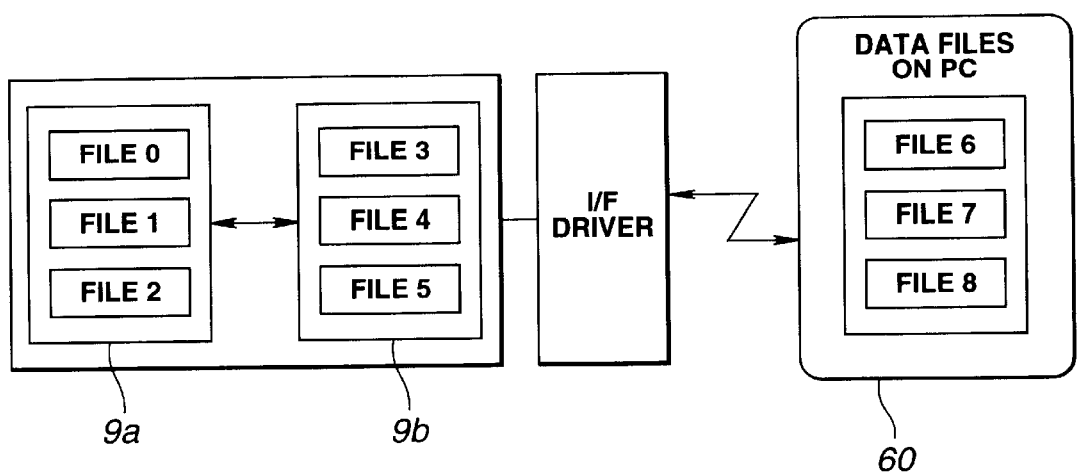
FIG. 14 illustrates the state of task files recorded on each flash memory and each personal computer.

Thus, with the personal computer 60, the task files, stored in the first flash memory 9a enclosed in the IC recorder 1, in the second flash memory 9b detachably mounted on the IC recorder 1 or in the storage unit of the personal computer 60, that is task files 0 to 8, can be moved freely between the personal computer 60 and the IC recorder 1, without the user having to know from which memory or storage unit the task file is derived, as shown in FIG. 14. That is, even in data transmission/reception equipment or with the external devices, the task files can be supervised without making a distinction as to the type of the recording medium, subject to coincidence of the transmission/reception format.

Even if the second flash memory 9b, mounted on the IC recorder 1, is detached from the IC recorder 1, the personal computer 60 is able to generate new TOC data, based on the TOC data stored in the first flash memory 9a and in the storage unit of the personal computer 60, that is on the TOC data except the TOC data stored in the second flash memory 9b, to read or write the task files based on the generated TOC data. Thus, even if the second flash memory 9b is dismounted, the IC recorder 1 is able to record/reproduce the task files without being affected by such dismounting of the second flash memory 9b.

Although the task files composed of speech data are taken as an example in the foregoing description, this is merely illustrative in that data other than such task file data can be used within the scope of the present invention.

Industrial Applicability

With the recording/reproducing apparatus of the present invention, respective management data are read out from respective storage means to generate new management data, and the respective storage means are handled as one based on new management data to perform control on data writing and readout, so that the data can be handled easily without the user having to know in which storage means the data are stored.

Also, with the recording/reproducing system according to the present invention, an external control device controls the control means of the recording/reproducing apparatus to read out respective management data from plural storage means via an interface and to read out management data from other storage means. Based on the read-out management data, the respective storage means are handled as unitary storage means to control data writing and data reading. Thus, the data can be handled easily without the operator having to know in which storage means the data are stored.

What is claimed is:

1. A recording/reproducing apparatus comprising:
   a plurality of storage means in which data and management data for supervising the data are respectively stored; and
   control means for generating new management data for supervising said plurality of storage means as sole storage means, based on the respective management data read from each of said plurality of storage means, said control means controlling writing and reading of said plurality of storage means based on the generated new management data.

2. The recording/reproducing apparatus according to claim 1 wherein said generated new management data includes discriminating data indicating, based on the management data read out from said plurality of storage means, in which one of said plurality of storage means said data has been stored.

3. The recording/reproducing apparatus according to claim 2 wherein said control means includes a storage unit for storing said generated new management data.

4. The recording/reproducing apparatus according to claim 1 wherein at least one of said storage means is detachably mounted on the recording/reproducing apparatus, and wherein said control means determines upon starting the operation whether the storage means detachably provided on the recording/reproducing apparatus is loaded on the recording/reproducing apparatus.

5. The recording/reproducing apparatus according to claim 4 wherein, when it is determined that the storage means detachably mounted on the recording/reproducing apparatus is not loaded on the recording/reproducing apparatus, said control means generates said new management data based on management data of other storage means.

6. The recording/reproducing apparatus according to claim 1 wherein, when the data stored in one of said plurality of storage means has been moved to other storage means, said control means deletes the data moved from said one storage means to the other storage means from said one storage means, and said control means causes re-writing of the management data of said one storage means and the management data of said other storage means.

7. The recording/reproducing apparatus according to claim 1 wherein, when the data stored in one of said plurality of storage means is moved within said one storage means, said control means causes management data stored in said one storage means to be rewritten after the data stored in said one storage means has been moved within said one storage means.

8. The recording/reproducing apparatus according to claim 1 further comprising:
   means for encoding signals supplied thereto to form data; and
   decoding means for decoding data written in one of said plurality of storage means, wherein
   said control means performs control to write the data from said means for encoding in one of said plurality of storage means and to read data stored in one of said plurality of storage means.

9. The recording/reproducing apparatus according to claim 8 further comprising:
   an actuating unit actuated by a user, wherein
   said control means causes the data from said means for encoding to be written in one of said plurality of storage means upon recording started by said actuating unit, said control means causing halting of writing of data from said means for encoding in one of said plurality of storage means upon termination of recording by said actuating unit, said control means handling the data from said means for encoding during a period from the starting of recording until the halting of recording as one unitary data.

10. A recording/reproducing apparatus comprising:
    first storage means in which data and management data for supervising said data are written and which cannot be dismounted from the apparatus; and
    second storage means in which data and management data for supervising said data are written and which can be mounted on and dismounted from the apparatus; and
    control means for controlling the writing to and reading from said first and second storage means, based on the management data written in said first storage means and the management data written in said second storage means, for generating further management data for supervising said first and second storage means as one storage means, based on respective management data read from said first and second storage means, and for controlling the writing and reading for said first and second storage means based on the generated further management data.

11. The recording/reproducing apparatus according to claim 10 wherein said control means generates said further management data including discriminating data specifying, based on the management data read from said first and second storage means, in which of said first and second storage means the data is stored.

12. The recording/reproducing apparatus according to claim 11 wherein said control means includes a storage unit for storing said further management data.

13. The recording/reproducing apparatus according to claim 10 wherein said control means verifies whether said second storage means has been mounted on the apparatus at an operation starting time.

14. The recording/reproducing apparatus according to claim 13 wherein, when it is verified that the second storage means has not been mounted on the apparatus, said control means generates said further management data based on said management data in said first storage means.

15. The recording/reproducing apparatus according to claim 10 wherein, when the data stored in one of said first and second storage means is moved to the other storage means, said control means deletes the data moved from said one storage means to the other storage means and rewrites management data of said one storage means and the other storage means.

16. The recording/reproducing apparatus according to claim 10 wherein said control means rewrites the management data stored in one of the first and second storage means after the data stored in said one of the first and second storage means is moved within said one of the first and second storage means.

17. The recording/reproducing apparatus according to claim 10 further comprising:

encoding means for encoding signals supplied thereto to form data; and decoding means for decoding data written in one of the first and second storage means, wherein said control means performs control to write data from said encoding means in one of the first and second storage means and to read out data stored in one of the first and second storage means.

18. The recording/reproducing apparatus according to claim 17 further comprising:

an actuating unit actuated by a user, wherein said control means causes the data from said encoding means to be written in one of said first and second storage means upon recording started by said actuating unit, said control means causes halting of writing of data from said encoding means in one of said first and second storage means on termination of recording by said actuating unit, and said control means handles the data from said encoding means during a period from starting of recording until halting of recording as one unitary data.

* * * * *